(12) United States Patent  (10) Patent No.: US 8,549,175 B2
Krishna  (45) Date of Patent: Oct. 1, 2013

(54) METHODS AND APPARATUS FOR ADAPTIVELY SCHEDULING A FINGER STABILIZATION ALGORITHM

(75) Inventor: Arvind S. Krishna, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 12/712,305

(22) Filed: Feb. 25, 2010

(65) Prior Publication Data

US 2011/0055365 A1    Mar. 3, 2011

Related U.S. Application Data

(60) Provisional application No. 61/185,535, filed on Jun. 9, 2009.

(51) Int. Cl.
*G06F 15/173* (2006.01)
(52) U.S. Cl.
USPC .......................................... 709/239; 709/238
(58) Field of Classification Search
USPC ......................................... 709/223, 224, 238
See application file for complete search history.

(56) References Cited

U.S. PATENT DOCUMENTS

| | | | |
|---|---|---|---|
| 6,480,473 | B1 | 11/2002 | Chambers et al. |
| 6,490,244 | B1 | 12/2002 | Pegrum et al. |
| 8,094,585 | B2 | 1/2012 | Liang et al. |
| 2004/0203435 | A1 | 10/2004 | Karlquist et al. |
| 2005/0060429 | A1 | 3/2005 | Massoulie et al. |
| 2005/0223102 | A1 | 10/2005 | Zhang et al. |
| 2006/0251062 | A1 | 11/2006 | Jain et al. |
| 2007/0204061 | A1 * | 8/2007 | Chen et al. ..................... 709/238 |
| 2007/0230482 | A1 | 10/2007 | Shim et al. |
| 2007/0237089 | A1 | 10/2007 | Chen et al. |

(Continued)

FOREIGN PATENT DOCUMENTS

| | | |
|---|---|---|
| CN | 101378325 A | 3/2009 |
| JP | 2005323346 A | 11/2005 |
| WO | WO03098814 | 11/2003 |

OTHER PUBLICATIONS

Maenpaa J et al: "Study on maintenance operations in a chord-based Peer-to-Peer session initiation protocol overlay network" Parallel & Distributed Processing, 2009. IPDPS 2009. IEEE International Symposium on, IEEE, Piscataway, NJ, USA, May 23, 2009, pp. 1-9, XP031487394.*

(Continued)

*Primary Examiner* — Wing F Chan
*Assistant Examiner* — Andrew Woo
(74) *Attorney, Agent, or Firm* — Kristine U Ekwueme

(57) ABSTRACT

Methods and apparatus for adaptively scheduling a finger stabilization algorithm. A method is provided that includes comparing first and second finger determinations associated with a node, increasing a time interval between executions of a finger stabilization algorithm if differences between the finger determinations satisfy a first criteria, and decreasing the time interval between executions of the finger stabilization algorithm if differences between the finger determinations satisfy a second criteria. An apparatus is provided that includes a processor configured to compare first and second finger determinations associated with a node, and a timer coupled to the processor and configured to increase a time interval between executions of a finger stabilization algorithm if differences between the finger determinations satisfy a first criteria, and decrease the time interval between executions of the finger stabilization algorithm if the differences between the finger determinations satisfy a second criteria.

36 Claims, 4 Drawing Sheets

(56) References Cited

U.S. PATENT DOCUMENTS

| | | | |
|---|---|---|---|
| 2008/0288654 | A1 | 11/2008 | Matuszewski et al. |
| 2009/0063675 | A1* | 3/2009 | Faris et al. .................... 709/224 |
| 2011/0004681 | A1 | 1/2011 | Das et al. |
| 2012/0185899 | A1 | 7/2012 | Riedl et al. |

OTHER PUBLICATIONS

Rossi D et al: "Gambling heuristic on a chord ring" Global Telecommunications Conference, 2005. GLOBECOM '05. IEEE St. Louis, MO, USA, Nov. 28-Dec. 2, 2005, Piscataway, NJ, USA, IEEE LNKD DOI: 10.1109/GLOCOM.2005.1577763, vol. 2, Nov. 28, 2005, pp. 873-878, XP010879590.*

16th Mobile and Wireless Communication Summit—"Field Division Routing", 2007, p. 629-634.

International Search Report and Written Opinion—PCT/US2010/038040, International Search Authority—European Patent Office—Sep. 29, 2010.

Kunzmann G. et al: "Analyzing and Modifying Chord's Stabilization Algorithm to Handle High Churn Rates" IEEE Explore 2005, pp. 885-890, XP002601159.

Maenpaa G Camarillo J Hautakorpi Ericsson J: "A Self-tuning Distributed Hash Table (DHT) for Resource Location And Discovery (RELOAD); draft-maenpaa-p2psip-self-tuning-00.txt" A Self-Tuning Distributed Hash Table (DHT) for Resource Location and Discovery (RELOAD); draft-maenpaa-p2psip-self-tuning-00.txt, Internet Engineering Task Force, IETF; Standard Working Draft, Internet Society (ISOC) 4, Rue Des Falaises CH-1205 Geneva, Feb. 16, 2009, XP015061541.

USENIX Annual Technical Conference—"Structured and Unstructured Overlays Under the Microscope", 2006, p. 341-355.

Chen W, et al., "Dynamic Local Peer Group Organizations for Vehicle Communications," Mobile and Ubiquitous Systems—Workshops, 2006. 3rd Annual International Conference on, IEEE, Pl. Jul. 1, 2006, pp. 1-8, XP031089403 ISBN: 978-0-7803-9791-0 p. 3, right-hand column, line-6-line 52.

Ganesh A. et al., "Peer Counting and Sampling in Overlay Networks Based on Random Walks," Distributed Computing, Springer, Berlin, DE LNKD-DOI: 10.1007/S00446-007-0027-Z, vol. 20, No. 4, Jun. 5, 2007, pp. 267-278, XP019564156 ISSN: 1432-0452 abstract paragraph [001.]-paragraph [02.2].

Ghinita G, et al., "An Adaptive 'Stabilization Framework for Distributed Hash Tables," Parallel and Distributed Processing Symposium, 2006. IPDPS 2006. 20th International Rhodes Island, Greece Apr. 25-29, 2006, Piscataway, NJ, USA,IEEE LNKDD01: 10.1109/IPDPS. 2006.1639269, 25 Apri 1, 2006 (2006-04-25), pp. 1-10, XP010920239 ISBN: 978-1-4244-0054-6 p. 3, left-hand column, line 3-line 17 p. 6, left-hand column, line 29-line 36.

Kunzmann, G., "Increasing the reliability of structured P2P networks", Design of Reliable Communication Networks, 2005 (DRCN 2005), Proceedings 5th International Workshop on, IEEE, Oct. 10-19, 2005.

Luo X., et al., "DHT-assisted probabilistic exhaustive search in unstructured P2P networks", Parallel and Distributed Processing, 2008 IPDPS 2008, IEEE International Symposium on IEEE, Apr. 14-18, 2008, pp. 1-9.

Merrer E.L., et al., "Peer to Peer Size Estimation in Large and Dynamic Networks: A Comparative Study," 2006 15th IEEE International Conference on High Performance Distributed Computing Paris, France Jun. 19-23, 2006, Piscataway, NJ, USA, IEEE, Jun. 19, 2006, pp. 7-17, XP010926036 ISBN: 978-1-4244-0307-3 abstract p. 8, left-hand column, line 5-line 15 paragraph [_II.].

Stoica I, et al., "MIT-LCS-TR-819—Chord: A Scalable Peer-to-peer Lookup Service for Internet Applications" Internet Citation Mar. 23, 2001, XP002328538 Retrieved from the Internet: URL:http://www.1cs.mi t.edu/publi cati ons/pu bs/ps/MIT-LCS-TR-819.ps> [retrieved on May 17, 2005] paragraph [04.4]-paragraph [4.4.1].

Taiwan Search Report—TW099118763—TIPO—Apr. 22, 2013.

Zhu Y., et al., "Ferry: An architecture for content-based publish/subscribe services on P2P networks", Parallel Processing, 2005, ICPP 2005, International Conference on IEEE, Jun. 17, 2005.

\* cited by examiner

METHODS AND APPARATUS FOR ADAPTIVELY SCHEDULING A FINGER STABILIZATION ALGORITHM

CLAIM OF PRIORITY UNDER 35 U.S.C. §119

The present application for patent claims priority to Provisional Application No. 61/185,535 entitled "Methods and Apparatus for an Adaptive Self Tunable Approach for Overlay Routing Stabilization and Size Estimation," filed Jun. 9, 2009, and assigned to the assignee hereof and hereby expressly incorporated by reference herein.

RELATED APPLICATION

The present Application for Patent is related to application Ser. No. 12/712,983, entitled "Methods and Apparatus for Enhanced Overlay State Maintenance," filed Feb. 25, 2010, and assigned to the assignee hereof.

BACKGROUND

1. Field

The present application relates generally to the operation of overlay networks, and more particularly, to methods and apparatus for adaptively scheduling a finger stabilization algorithm in a peer-to-peer overlay network.

2. Background

A network in which member nodes obtain services in the absence of server-based infrastructure is referred to as a "peer-to-peer" overlay network. In a peer-to-peer overlay, peer nodes co-operate with each other to provide services and to maintain the network. Peer-to-peer overlay networks can be built on top of an underlying network, such as a network utilizing the Internet Protocol (IP).

In a peer-to-peer overlay network, each node has knowledge of one or more peers participating in the overlay. A simple but inefficient approach to routing data on the overlay network from a source node to a destination node is to continually pass the data to the next hop or successor node (i.e., node logically next to the source node in the identity space) until the destination node is reached. However this approach incurs excessive latency as the size of the overlay network and number of hops increases. Therefore, for routing optimization, each node maintains a list of fingers that are one node, two nodes, four nodes, or up to $2^{(m-1)}$ nodes away from itself; where m is the number of bits assigned to each node identifier. This helps in minimizing the number of hops needed to route data from node O(n) to node O(log(n)) where n is the number of nodes for the average case.

However, nodes may come and go at any time and result in changes in the overlay network configuration that affects the fingers known to a particular node. To compensate for this variability, each node re-runs a finger stabilization algorithm that re-computes the fingers known to that node. The results of the finger stabilization algorithm are stored in a finger table. Unfortunately, since each node maintains it own finger table, determining the frequency at which each node needs to run its finger stabilization algorithm may be problematic. For example, if a node does not run its finger stabilization algorithm often enough, its finger table may become stale resulting in inefficient and delayed packet routing. If a node runs its finger stabilization algorithm too often, this may result in wasting overlay bandwidth and/or placing a burden on other nodes on the overlay network. For example, running the stabilization algorithm requires power and excessive execution of the stabilization algorithm may waste power at battery operated nodes.

Therefore, it would be desirable to have a simple cost effective mechanism that operates to allow a node to adaptively schedule a finger stabilization algorithm to overcome the problems described above.

SUMMARY

In one or more aspects, an adaptive scheduling (AS) system, comprising methods and apparatus, is provided that operates adaptively to allow a node to determine a time interval between executions of a finger stabilization algorithm and thereby adaptively schedule execution of the algorithm.

In an aspect, a method is provided for adaptively scheduling a finger stabilization algorithm on a peer-to-peer overlay network. The method comprises comparing first and second finger determinations associated with a node, increasing a time interval between executions of a finger stabilization algorithm if differences between the first and second finger determinations satisfy a first criteria, and decreasing the time interval between executions of the finger stabilization algorithm if the differences between the first and second finger determinations satisfy a second criteria.

In an aspect, an apparatus is provided for adaptively scheduling a finger stabilization algorithm on a peer-to-peer overlay network. The apparatus comprises a processor configured to compare first and second finger determinations associated with a node, and a timer coupled to the processor and configured to increase a time interval between executions of a finger stabilization algorithm if differences between the first and second finger determinations satisfy a first criteria, and decrease the time interval between executions of the finger stabilization algorithm if the differences between the first and second finger determinations satisfy a second criteria.

In an aspect, an apparatus is provided for adaptively scheduling a finger stabilization algorithm on a peer-to-peer overlay network. The apparatus comprises means for comparing first and second finger determinations associated with a node, means for increasing a time interval between executions of a finger stabilization algorithm if differences between the first and second finger determinations satisfy a first criteria, and means for decreasing the time interval between executions of the finger stabilization algorithm if the differences between the first and second finger determinations satisfy a second criteria.

In an aspect, a computer program product is provided for adaptively scheduling a finger stabilization algorithm on a peer-to-peer overlay network. The computer program product comprises a computer-readable medium embodying codes executable by a processor to compare first and second finger determinations associated with a node, increase a time interval between executions of a finger stabilization algorithm if differences between the first and second finger determinations satisfy a first criteria, and decrease the time interval between executions of the finger stabilization algorithm if the differences between the first and second finger determinations satisfy a second criteria.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects and implementations of an AS system for adaptively determining a time interval between executions of a finger stabilization algorithm and thereby adaptively schedule execution of the algorithm.

Figure 1:
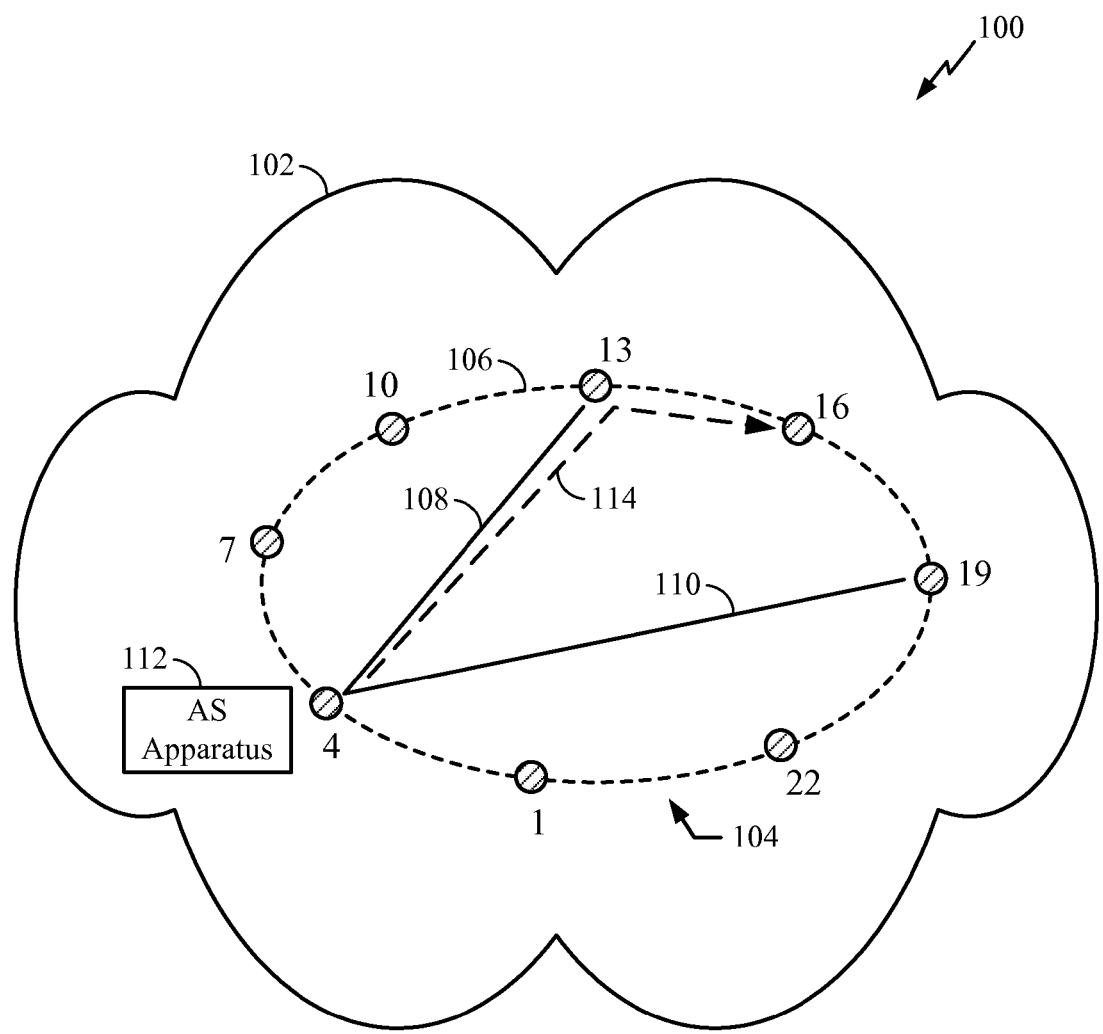
FIG. 1 shows a network that illustrates the operation of the AS system.

FIG. 1 shows a network 100 that illustrates the operation of an AS system. The network 100 includes an underlying network 102 which comprises any type of network, such as an Internet Protocol network. Although the underlying network 102 is shown as a single entity, the underlying network may comprise any number or types of networks such as WANs, LANs, wireless networks and/or any other type of network.

A peer-to-peer overlay network 104 comprises a subset of the nodes of the underlying network 102 and operates utilizing the services of the underlying network 102 to allow those nodes to communicate. In the peer-to-peer overlay network 104, the nodes are connected by communication links 106 to form a circular routing path. The communication links 106 may be secure tunnels provided by the underlying network 102. The peer-to-peer overlay network 104 operates with a set of permissions and interactions that are distinct from underlying network 102. It should also be noted that the peer-to-peer overlay network 104 may have any topology or architecture to enable any routing pattern and it is not limited to the routing shown in FIG. 1.

Each of the nodes in the peer-to-peer overlay network 104 establishes a node identifier. For simplicity and ease of description, the node identifiers for the nodes of the peer-to-peer overlay network 104 are (1, 4, 7, 10, 13, 16, 19, and 22). It should be noted that in practice, the overlay network may comprise a very large number of nodes and utilize larger node identifiers. During operation, traffic can flow around the peer-to-peer overlay network 104 in either direction.

To facilitate traffic routing, each node of the overlay network 104 computes and maintains a finger table that identifies routing fingers that cut across the overlay network 104. For example, each node runs a finger stabilization algorithm to identify the routing fingers based on the overlay network's current configuration. Thus, as nodes join and leave the overlay network, the finger stabilization algorithm will identify the routing fingers associated with each node. For example, the finger stabilization algorithm running at node 4 has identified finger 108 to node 13 and finger 110 to node 19. The use of the fingers provides more efficient packet routing across the overlay network 104. For example, a packet at node 4 to be routed to node 16 can be routed along finger 108 in a first hop, and then routed to node 16 in a second hop as illustrated by routing path 114.

An AS apparatus is provided at each of the nodes of the overlay network 104. For simplicity, the AS apparatus 112 is shown at node 4 of the overlay network 104; however, a similar AS apparatus may be located at each node of the overlay network 104. The AS apparatus 112 operates to adaptively schedule executions of a finger stabilization algorithm performed at node 4. The AS apparatus 112 is suitable for use with any type of finger stabilization algorithm and the following provides a brief description of its operation.

The AS apparatus 112 starts with an initial or base time interval (i.e., t seconds) between executions of the finger stabilization algorithm. When the stabilization algorithm is run, node 4 may discover N fingers. The AS apparatus 112 measures a time interval for t seconds and triggers node 4 to execute the finger stabilization algorithm again. If the differences between two finger results (i.e., number and/or types of fingers determined) meets a first criteria, then the AS apparatus 112 operates to increase the time interval between executions of the finger stabilization algorithm. For example, in one implementation, the time interval is increase by a factor of 2. However, if the differences meet second criteria, then the AS apparatus 112 operates to decrease the time interval between executions of the finger stabilization algorithm. For example, in one implementation the time interval is decreased by a factor of 2. The first and second criteria can be defined to meet any suitable performance goals. For example, the first criteria may be met if there are no differences between the two finger results. The second criteria may be met if there are any differences found between the two finger results. Thus, it is also possible to define the first and second criteria to test any set of conditions with respect to changes in the finger table of a particular node.

Therefore, through this adaptive self-tunable approach, the AS apparatus 112 allows each node to arrive independently and adaptively at a steady state interval between executions of the finger stabilization algorithm. Furthermore, the system allows each node to approximate independently the size of the overlay. For example, if a particular node has identified N fingers in the overlay network at time t, then there are at most $2^N$ nodes in the overlay network at that time. Thus, if a particular node has identified three unique fingers, then that node approximates the size of the overlay network to be 8 ($2^3$) nodes. However, this approximation will vary with time and serves to provide a node with an approximate size range of the overlay network.

The AS system requires no coordination among nodes or global knowledge of the system to schedule the finger stabilization algorithm, which is valuable for peer-to-peer distributed applications. A more detailed description of the operation of the AS apparatus 112 is provided below.

Figure 2:
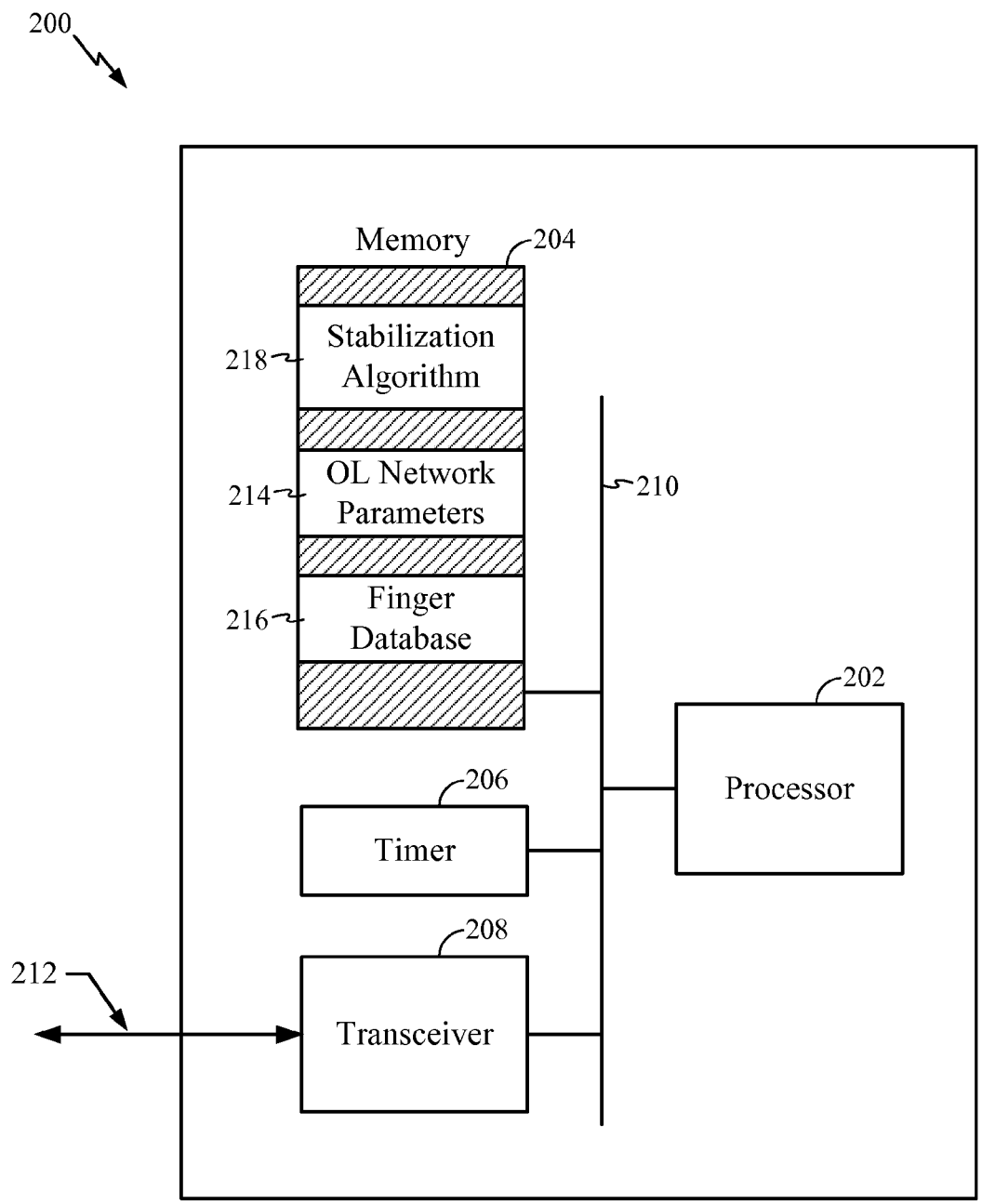
FIG. 2 shows an exemplary AS apparatus constructed in accordance with the AS system.

FIG. 2 shows an exemplary AS apparatus 200 constructed in accordance with the AS system. For example, the AS apparatus 200 is suitable for use as the AS apparatus 112 shown in FIG. 1. The AS apparatus 200 comprises processor 202, memory 204, timer 206, and transceiver 208 all coupled to communicate using data bus 210. It should be noted that the AS apparatus 200 is just one implementation and that other implementations are possible.

The transceiver 208 comprises hardware and/or hardware executing software that operate to allow the AS apparatus 200 to communicate data or other information with a plurality of nodes on a peer-to-peer overlay network. The transceiver 210 is operable to establish one or more communication links 212 with nodes of the peer-to-peer overlay network for the purpose of performing a finger stabilization algorithm. For example, the communication links 212 may be secure tunnels that are formed utilizing the services of an underlying IP network.

The memory 204 comprises any suitable storage device operable to allow the storage and retrieval of information during operation of the AS system. The memory 204 operates to store overlay network parameters 114 that comprise information about an overlay network including node identifiers, underlying network identifiers, service identifiers and any other parameters or information related to the operation or use of an overlay network. The overlay network parameters 114 also comprise first and second sets of criteria that are used during operation of the AS system. For example, the sets of criteria are stored in the memory 204 by the processor 202. The processor 202 is also operable to update, change, or otherwise modify the sets of criteria. The sets of criteria are used during operation of the AS system to determine when to increase or decrease a time interval between executions of a finger stabilization algorithm 218.

The memory 204 also operates to store finger database 216 comprising finger information associated with one or more nodes of a peer-to-peer overlay network. The finger database 116 is used to store information about the number and types of fingers available to a node. For example, the finger database 216 comprises information such at the number of fingers, types of fingers, finger end nodes, and any other information related to fingers of an overlay network. The information in the finger database 116 is determined from the execution of a finger stabilization algorithm 218 by the processor 202.

The timer 206 comprises hardware and/or hardware executing software that operates to measure a time interval based on time parameters received from the processor 202. For example, the time parameters include a count down value that is used to initialize a counter. The count down value corresponds to a particular time interval to be measured by the timer 206. Thus, the processor 202 may set the timer 206 to measure any desirable time interval. When the time interval has been measured, the timer 206 indicates timer expiration to the processor 202. For example, the timer 206 measures a particular time interval, at the end of which, the processor 202 is notified and thereafter operates to execute the finger stabilization algorithm 218. The finger stabilization algorithm 218 operates to determine information about fingers associated with a particular node.

The processor 202 comprises at least one of a CPU, processor, gate array, hardware logic, memory elements, and/or hardware executing software. The processor 202 operates to determine fingers available to a particular node in an overlay network. For example, the processor 202 executes the finger stabilization algorithm 218 and stores information about the determined fingers in the finger database 216. The processor 202 also operates to compare finger determinations determined by the finger stabilization algorithm to determine whether to increase or decrease a time interval before the finger stabilization algorithm is performed. The processor 202 controls the timer 206 to measure this time interval.

Adaptive Time Interval Determination

During operation of the AS system, the timer 206 operates to measure time intervals, after which, the processor 202 executes the finger stabilization algorithm 218. For example, the timer 206 signals the processor 202 that a time interval has ended or expired. The processor 202 operates to utilize the overlay network parameters 214 to determine information used to execute the finger stabilization algorithm 218. The resulting finger determination is stored in the finger database 216.

The processor 202 then determines the time interval to be measured before the next execution of the finger stabilization algorithm. The processor 202 determines the next time interval by comparing two finger results of the finger stabilization algorithm. For example, the processor 202 may compare the two most recent finger determinations, or may compare averaged finger results, or may select any particular finger results to compare. If the difference between the two finger results meet a first set of criteria (i.e., same number, types, end nodes, etc.) then the processor 202 increases the time parameters to correspondingly increase the time interval (TI). For example, in one implementation the time interval is increased as follows up to a selected maximum $TI_{max}$, which guarantees that the algorithm is performed at a minimum frequency of $1/TI_{max}$.

$$TI_{new}=TI_{old}*2$$

If the difference between the two finger results meet a second set of criteria, then the processor 202 decreases the time parameters to correspondingly decrease the time interval (TI). For example, in one implementation the time interval is decreased as follows, down to a selected minimum $TI_{min}$, which guarantees that the algorithm is performed at a maximum frequency of $1/TI_{min}$.

$$TI_{new}=TI_{old}/2$$

Once the new time parameters are determined, the processor 202 provides the time parameters to the timer 206 to allow the new time interval to be measured. At the end of the time interval, the processor 202 executes the finger stabilization algorithm again. It should be noted that the techniques for increasing and decreasing the time interval provided above are just one implementation and that other techniques may be used. For example, the time interval may be increased and/or decreased at a faster or slower rate than described above. Virtually any technique for increase and/or decreasing the time interval may be used.

It should also be noted that the processor 202 may generate any set of parameters to define the first and second set of criteria to obtain selected performance of the AS system. For example, the first set of criteria may be defined such that these criteria are met if there are no differences or only small differences between the two finger determinations. Furthermore, the second set of criteria may be defined such that these criteria are met if there are any differences or only a large number of differences between the two finger determinations. Thus, the sets of criteria can be set by the processor 202 to detect virtually any finger dynamic (i.e., no change, small change, large change, particular change, etc.) and adjust the time interval between executions of the finger stabilization algorithm based on the detected finger dynamics.

Overlay Size Approximation

The AS system adaptively operates to allow each node to determine the rate at which it needs to run its finger stabilization algorithm. Furthermore, when running the algorithm each node can independently approximate the size of the overlay. For example, the processor 202 can determine the size of an overlay network as being approximately equal to the value of two raised to the number of determined fingers. Therefore, if the finger stabilization algorithm results in 10 fingers, the processor 202 operates to approximate the size of the overlay to be $2^{10}$ or approximately 1024 nodes. Thus, as the number of fingers determined by a node changes, that node is able to determine an approximate size range for the overlay network.

In one implementation, the AS system comprises a computer program product having one or more program instructions ("instructions") or sets of "codes" stored or embodied on a computer-readable medium. When the codes are executed by at least one processor, for instance, a processor 202, their execution causes the AS apparatus 200 to provide the functions of the AS system described herein. For example, the computer-readable medium comprises a floppy disk, CDROM, memory card, FLASH memory device, RAM, ROM, or any other type of memory device or computer-readable medium that interfaces to the AS apparatus 200. In another aspect, the sets of codes may be downloaded into the AS apparatus 200 from an external device or communication network resource. The sets of codes, when executed, operate to provide aspects of an AS system as described herein.

Figure 3:
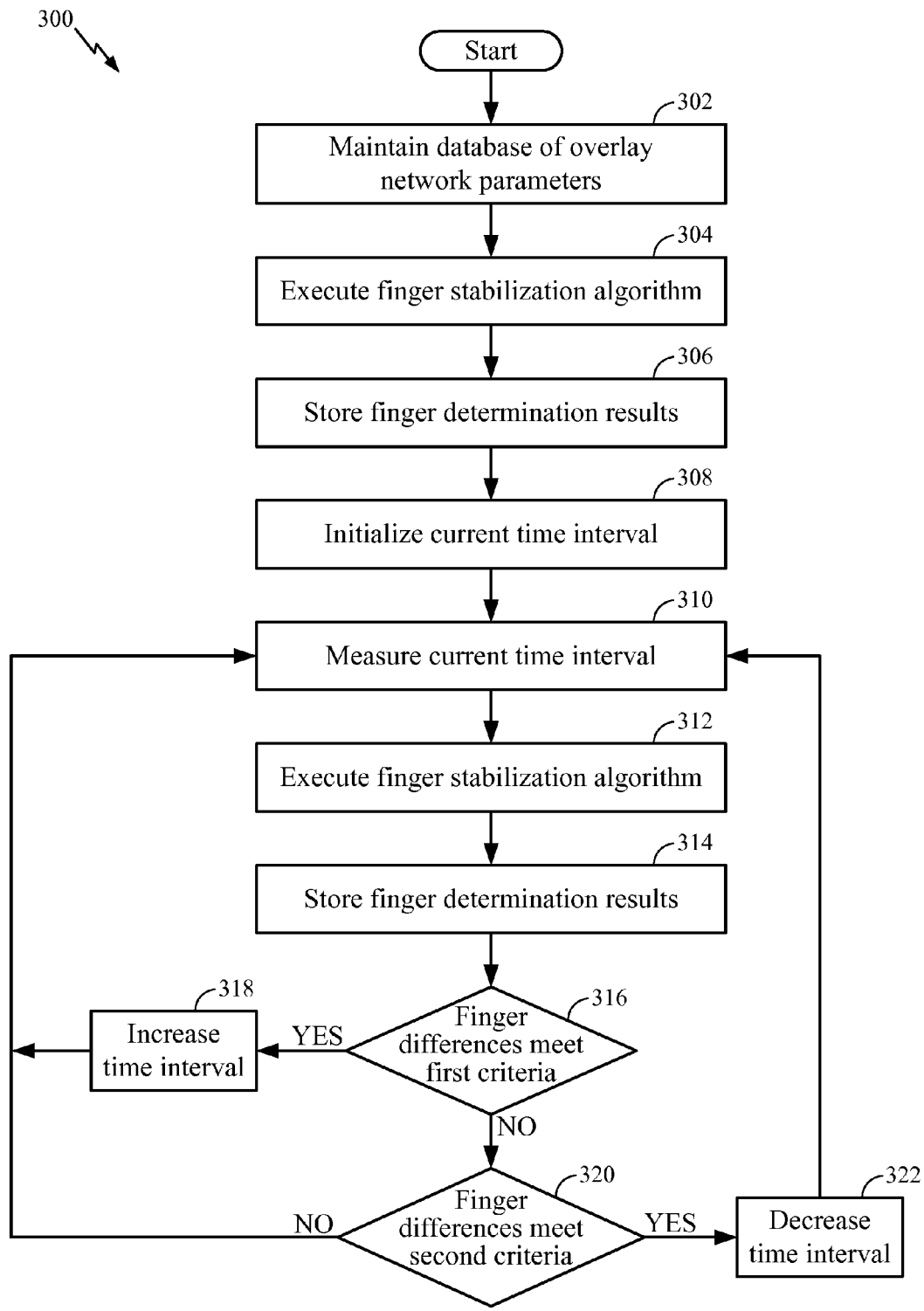
FIG. 3 shows an exemplary method for adaptively scheduling a finger stabilization algorithm in accordance with the AS system.

FIG. 3 shows an exemplary method 300 for adaptively scheduling a finger stabilization algorithm in accordance with the AS system. For clarity, the method 300 is described below with reference to the AS apparatus 200 shown in FIG. 2. In one implementation, the processor 202 executes one or more sets of codes to control the AS apparatus 200 to perform the functions described below.

At block 302, a database of overlay network parameters is maintained. In one implementation, the processor 202 maintains the parameters database 214 in the memory 204. For example, the parameters database 214 comprises, but is not limited to, IP addresses, node identifiers, and/or any other parameters related to one or more nodes operating on a peer-to-peer overlay network.

At block 304, a finger stabilization algorithm is performed. In one implementation, the processor 202 executes the stabilization algorithm 218 to communicate with other nodes of an overlay network using the transceiver 208 and the communication links 212 to determine fingers of the overlay network. The processor 202 performs any suitable stabilization algorithm to determine the fingers associated with the overlay network.

At block 306, the results of the finger stabilization algorithm are stored in memory. For example, the processor 202 stores the results of the finger stabilization algorithm in the memory 204 as part of the finger database 216.

At block 308, a time interval is initialized. For example, the processor 202 inputs initial time parameters into the timer 206 so that the timer 206 can measure an initial time interval.

At block 310, the method waits for the current time interval to be measured. For example, the timer 206 measures the current time interval and provides an indication to the processor 202 when the time interval has expired.

At block 312, a finger stabilization algorithm is performed. In one implementation, in response to the timer 206 expiration, the processor 202 executes the stabilization algorithm 218 to communicate with other nodes of an overlay network using the transceiver 208 and the communication links 212 to determine fingers of the overlay network. The processor 202 performs any suitable stabilization algorithm to determine the fingers associated with the overlay network.

At block 314, the results of the finger stabilization algorithm are stored in memory. For example, the processor 202 stores the results of the finger stabilization algorithm in the memory 204 as part of the finger database 216.

At block 316, a determination is made as to whether the differences between two finger determinations met a first set of criteria. For example, the processor 202 retrieves the recent and previous finger results from the finger database 216 and compares them to determine if the differences between them met the first set of criteria. For example, the first set of criteria may be met if there are no differences or only small differences between the first and second finger determinations. If the first set of criteria is met, the method proceeds to block 318. If the first set of criteria is not met, the method proceeds to block 320.

At block 318, the current time interval is increased. For example, the processor 202 increases the time interval by a factor of 2 and inputs the new time parameters into the timer 206 so that the timer 206 can measure the updated time interval. The method then proceeds to block 310 to wait for expiration of the timer 206. It should be noted that the processor 202 can utilize any suitable technique or algorithm to increase the time interval.

At block 320, a determination is made as to whether the differences between two finger determinations met a second set of criteria. For example, the processor 202 retrieves the recent and previous finger results from the finger database 216 and compares them to determine if the differences between them met the second set of criteria. For example, the second set of criteria may be met if there are any differences or only large differences between the first and second finger determinations. If the second set of criteria is met, the method proceeds to block 322. If the second set of criteria is not met, the method proceeds to block 310 and does not change the time interval.

At block 322, the time interval is decreased. For example, the processor 202 decreases the time interval by a factor of 2 and inputs the new time parameters into the timer 206 so that the timer 206 can measure the updated time interval. The method then proceeds to block 310 to wait for expiration of the timer 206. It should be noted that the processor 202 can utilize any suitable technique or algorithm to decrease the current time interval. In one implementation, the time interval is decreased at a faster rate than it is increased.

Therefore, the method 300 is operable at a node to determine when fingers associated with an overlay network have changed and adaptively adjust a time interval between executions of a finger stabilization algorithm in accordance with the AS system. It should be noted that the method 300 is just one implementation and that the operations of the method 300 may be rearranged or otherwise modified within the scope of the various implementations. Thus, other implementations are possible.

Figure 4:
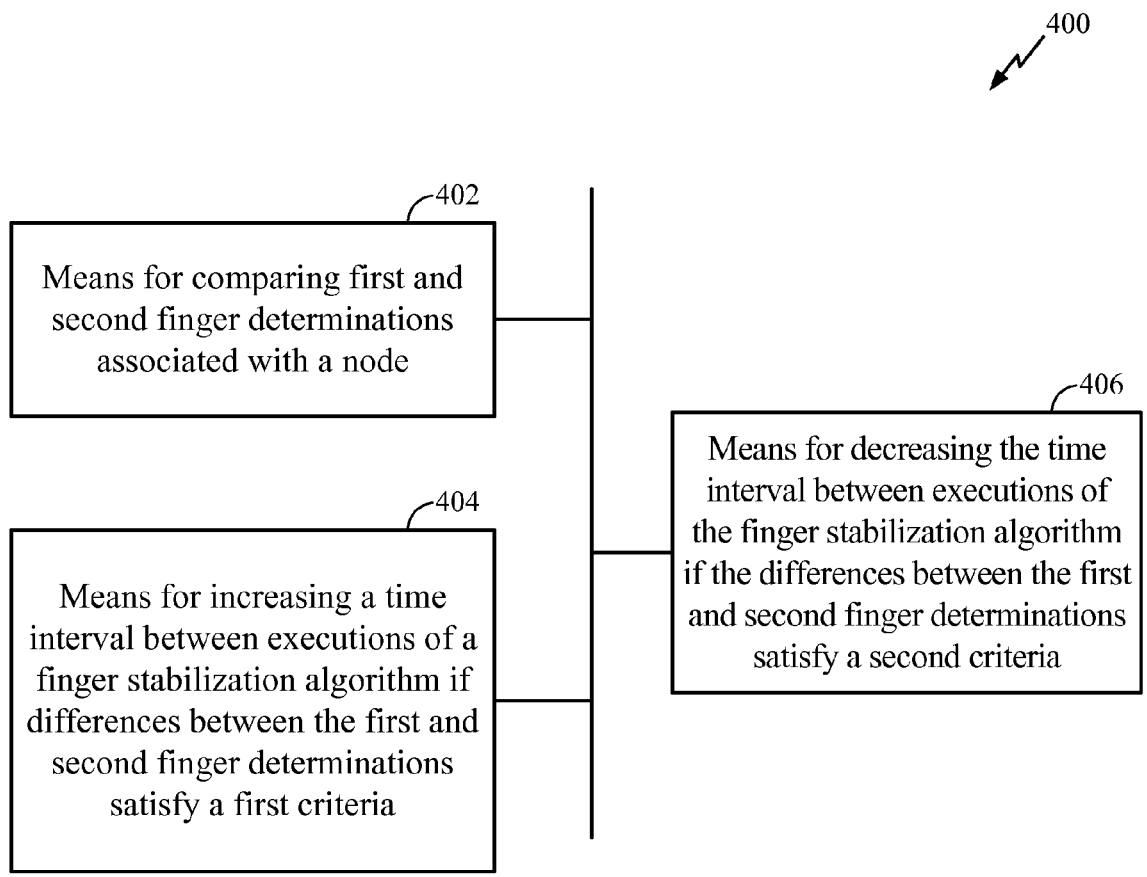
FIG. 4 shows an exemplary AS apparatus constructed in accordance with the AS system.

FIG. 4 shows an exemplary AS apparatus 400 constructed in accordance with the AS system. For example, the AS apparatus 400 is suitable for use as the AS apparatus 200 shown in FIG. 2. In an aspect, the AS apparatus 400 is implemented by at least one integrated circuit comprising one or more modules configured to provide aspects of an AS system as described herein. For example, in one implementation, each module comprises hardware and/or hardware executing software.

The AS apparatus 400 comprises a first module comprising means (402) for comparing first and second finger determinations associated with a node, which in an aspect comprises the processor 202. The AS apparatus 400 also comprises a second module comprising means (404) for increasing a time interval between executions of a finger stabilization algorithm if differences between the first and second finger determinations satisfy a first criteria, which in an aspect comprises the timer 206. The AS apparatus 400 also comprises a third module comprising means (406) for decreasing the time interval between executions of the finger stabilization algorithm if the differences between the first and second finger determinations satisfy a second criteria, which in an aspect comprises the timer 206.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an adaptive scheduling system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for adaptively scheduling a finger stabilization algorithm on a peer-to-peer overlay network, the method comprising:
   determining first and second finger determinations associated with a node;
   comparing the first and second finger determinations;
   increasing a time interval between executions of the finger stabilization algorithm if differences between the first and second finger determinations satisfy a first criteria;
   decreasing the time interval between executions of the finger stabilization algorithm if the differences between the first and second finger determinations satisfy a second criteria;
   repeating the operations of comparing, increasing, and decreasing to adaptively schedule the finger stabilization algorithm; and
   performing said increasing and said decreasing so that the time interval is decreased at a faster rate based on the second criteria than it is increased based on the first criteria.

2. The method of claim 1, wherein said first criteria comprises no differences between the first and second finger determinations and said second criteria comprises any differences between the first and second finger determinations.

3. The method of claim 1, further comprising retrieving at least one of the first and second finger determinations from a finger database.

4. The method of claim 1, wherein each of the first and second finger determinations comprises at least one parameter selected from a set of parameters comprising a total number of fingers parameter, one or more finger type parameters, and one or more finger end node parameters.

5. The method of claim 1, wherein said increasing comprises multiplying the time interval by a factor of 2 to increase the time interval.

6. The method of claim 1, wherein said decreasing comprises dividing the time interval by a factor of 2 to decrease the time interval.

7. The method of claim 1, further comprising performing at least one of said increasing and said decreasing using selected increasing and decreasing heuristics, respectively.

8. The method of claim 1, further comprising using at least one finger determination to approximate the size of the overlay network.

9. The method of claim 1, wherein the node is a portable device.

10. An apparatus for adaptively scheduling a finger stabilization algorithm on a peer-to-peer overlay network, the apparatus comprising:
    a processor configured to determine first and second finger determinations associated with a node;
    wherein the processor is further configured to compare the first and second finger determinations; and
    a timer coupled to the processor and configured to:
        increase a time interval between executions of a finger stabilization algorithm if differences between the first and second finger determinations satisfy a first criteria;
        decrease the time interval between executions of the finger stabilization algorithm if the differences between the first and second finger determinations satisfy a second criteria; and
        repeat the operations of comparing, increasing, and decreasing to adaptively schedule the finger stabilization algorithm;
    wherein said timer is configured to increase and decrease the time interval so that the time interval is decreased at a faster rate based on the second criteria than it is increased based on the first criteria.

11. The apparatus of claim 10, wherein said first criteria comprises no differences between the first and second finger determinations and said second criteria comprises any differences between the first and second finger determinations.

12. The apparatus of claim 10, wherein said processor is configured to retrieve at least one of the first and second finger determinations from a finger database.

13. The apparatus of claim 10, wherein each of the first and second finger determinations comprises at least one parameter selected from a set of parameters comprising a total number of fingers parameter, one or more finger type parameters, and one or more finger end node parameters.

14. The apparatus of claim 10, wherein said timer is configured to multiply the time interval by a factor of 2 to increase the time interval.

15. The apparatus of claim 10, wherein said timer is configured to divide the time interval by a factor of 2 to decrease the time interval.

16. The apparatus of claim 10, wherein said timer is configured to increase and decrease the time interval using selected increasing and decreasing heuristics, respectively.

17. The apparatus of claim 10, wherein said processor is configured to use at least one finger determination to approximate the size of the overlay network.

18. The apparatus of claim 10, wherein the node is a portable device.

19. An apparatus for adaptively scheduling a finger stabilization algorithm on a peer-to-peer overlay network, the apparatus comprising:
- means for determining first and second finger determinations associated with a node;
- means for comparing the first and second finger determinations;
- means for increasing a time interval between executions of the finger stabilization algorithm if differences between the first and second finger determinations satisfy a first criteria;
- means for decreasing the time interval between executions of the finger stabilization algorithm if the differences between the first and second finger determinations satisfy a second criteria;
- means for repeating the operations of comparing, increasing, and decreasing to adaptively schedule the finger stabilization algorithm; and
- means for performing said increasing and said decreasing so that the time interval is decreased at a faster rate based on the second criteria than it is increased based on the first criteria.

20. The apparatus of claim 19, wherein said first criteria comprises no differences between the first and second finger determinations and said second criteria comprises any differences between the first and second finger determinations.

21. The apparatus of claim 19, further comprising means for retrieving at least one of the first and second finger determinations from a finger database.

22. The apparatus of claim 19, wherein each of the first and second finger determinations comprises at least one parameter selected from a set of parameters comprising a total number of fingers parameter, one or more finger type parameters, and one or more finger end node parameters.

23. The apparatus of claim 19, wherein said means for increasing comprises means for multiplying the time interval by a factor of 2 to increase the time interval.

24. The apparatus of claim 19, wherein said means for decreasing comprises means for dividing the time interval by a factor of 2 to decrease the time interval.

25. The apparatus of claim 19, further comprising means for performing at least one of said increasing and said decreasing using selected increasing and decreasing heuristics, respectively.

26. The apparatus of claim 19, further comprising means for using at least one finger determination to approximate the size of the overlay network.

27. The apparatus of claim 19, wherein the node is a portable device.

28. A computer program product for adaptively scheduling a finger stabilization algorithm on a peer-to-peer overlay network, the computer program product comprising:
- a non-transitory computer-readable medium embodying codes executable by a processor to:
  - determine first and second finger determinations associated with a node;
  - compare the first and second finger determinations;
  - increase a time interval between executions of the finger stabilization algorithm if differences between the first and second finger determinations satisfy a first criteria;
  - decrease the time interval between executions of the finger stabilization algorithm if the differences between the first and second finger determinations satisfy a second criteria; and
  - repeat the operations of comparing, increasing, and decreasing to adaptively schedule the finger stabilization algorithm;
- wherein said codes are configured to increase and decrease the time interval so that the time interval is decreased at a faster rate based on the second criteria than it is increased based on the first criteria.

29. The computer-readable medium of claim 28, wherein said first criteria comprises no differences between the first and second finger determinations and said second criteria comprises any differences between the first and second finger determinations.

30. The computer-readable medium of claim 28, wherein said codes are configured to retrieve at least one of the first and second finger determinations from a finger database.

31. The computer-readable medium of claim 28, wherein each of the first and second finger determinations comprises at least one parameter selected from a set of parameters comprising a total number of fingers parameter, one or more finger type parameters, and one or more finger end node parameters.

32. The computer-readable medium of claim 28, wherein said codes are configured to multiply the time interval by a factor of 2 to increase the time interval.

33. The computer-readable medium of claim 28, wherein said codes are configured to divide the time interval by a factor of 2 to decrease the time interval.

34. The computer-readable medium of claim 28, wherein said codes are configured to increase and decrease the time interval using selected increasing and decreasing heuristics, respectively.

35. The computer-readable medium of claim 28, wherein said codes are configured to use at least one finger determination to approximate the size of the overlay network.

36. The computer-readable medium of claim 28, wherein the node is a portable device.

* * * * *